United States Patent [19]
Swarup et al.

[11] Patent Number: 5,331,080
[45] Date of Patent: Jul. 19, 1994

[54] EPOXIDE-PHOSPHOROUS ACID-CONTAINING REACTION PRODUCTS AND THEIR USE IN COATING COMPOSITIONS

[75] Inventors: Shanti Swarup; Gregory J. McCollum, both of Gibsonia; Paul J. Prucnal; Debra L. Singer, both of Pittsburgh, all of Pa.

[73] Assignee: PPG Industries, Inc., Pittsburgh, Pa.

[21] Appl. No.: 114,864

[22] Filed: Sep. 2, 1993

Related U.S. Application Data

[62] Division of Ser. No. 862,144, Apr. 2, 1992, abandoned.

[51] Int. Cl.⁵ .............................................. C08G 65/10
[52] U.S. Cl. ...................................... 528/89; 528/103; 528/112; 528/366; 525/530; 525/531; 525/533; 525/538
[58] Field of Search ............... 528/89, 103, 112, 366; 525/530, 531, 533, 538

[56] References Cited

U.S. PATENT DOCUMENTS

| | | | |
|---|---|---|---|
| 3,328,319 | 6/1967 | Galinke et al. | 260/2 |
| 3,483,169 | 12/1969 | Case et al. | 260/78.4 |
| 3,578,616 | 5/1971 | Harry et al. | 260/18 |
| 3,637,591 | 1/1972 | Coran | 260/47 EC |
| 3,655,816 | 4/1972 | Lorenz et al. | 260/830 R |
| 4,048,141 | 9/1977 | Doorakian et al. | 260/47 EC |
| 4,482,700 | 11/1984 | Kühnrich et al. | 528/279 |
| 4,992,525 | 2/1991 | Kriessmann et al. | 528/103 |
| 5,096,980 | 3/1992 | Yamazaki et al. | 525/438 |

FOREIGN PATENT DOCUMENTS

| | | |
|---|---|---|
| 48-017679 | 6/1973 | Japan . |
| 50-028420 | 9/1975 | Japan . |
| 54-160456 | 12/1979 | Japan . |
| 58-082547 | 5/1983 | Japan . |
| 58-082548 | 5/1983 | Japan . |
| 61-111380 | 5/1986 | Japan . |
| 877136 | 9/1961 | United Kingdom . |
| 1141377 | 1/1969 | United Kingdom . |

*Primary Examiner*—Melvyn I. Marquis
*Assistant Examiner*—Randy Gulakowski
*Attorney, Agent, or Firm*—William J. Uhl

[57] ABSTRACT

Acid functional compounds which are the reaction products of monoepoxides, phosphorus-containing acids and cyclic anhydrides are disclosed. The reaction products promote adhesion and prevent yellowing when added to curable film-forming compositions.

11 Claims, No Drawings

EPOXIDE-PHOSPHOROUS ACID-CONTAINING REACTION PRODUCTS AND THEIR USE IN COATING COMPOSITIONS

This is a division of application Ser. No. 07/862,144, filed Apr. 2, 1992 now abandoned on Oct. 29, 1993.

BACKGROUND OF THE INVENTION

Field of the Invention: The present invention relates to acid functional reaction products and to the use of these reaction products in coating compositions to promote adhesion and prevent yellowing.

BRIEF DESCRIPTION OF THE PRIOR ART

Curable film-forming compositions based on resinous binders are well known to form protective and decorative coating compositions. Many of these coating compositions, however, suffer from poor adhesion particularly when the coating is exposed to extreme conditions, particularly high humidity conditions. Also, certain of the resultant cured coatings, particularly those in which the curing reaction is catalyzed with an amine, yellow on cure. It is known in the art that phosphorus compounds such as triphenyl phosphite suppress yellowing in cured coatings. However, such compounds have a tendency to cause blushing or a surface haziness when the coating is exposed to humidity.

SUMMARY OF THE INVENTION

In accordance with the present invention, an acid functional compound which is the reaction product of a monoepoxide, a phosphorus-containing acid and an anhydride is provided.

The reaction products can be incorporated into curable film-forming compositions comprising resinous film formers which contain functional groups which are reactive with carboxyl groups and which have a tendency to yellow on cure. The reaction products are incorporated into the coating compositions in amounts of about 0.1 to 10 percent by weight based on resin solids of the film-forming compositions.

The curable film-forming compositions which may be in liquid or powder form are depositable on substrates to form films, particularly clear films, and may be applied to form a composite coating which comprises applying to a substrate a colored film-forming composition to form a basecoat followed by applying to said basecoat the clear film-forming composition to form a transparent topcoat over the basecoat.

DETAILED DESCRIPTION

Suitable monoepoxides which are useful in the practice of the invention are those which contain greater than 5 carbon atoms. Examples of such epoxy compounds are 1,2-epoxy compounds such as glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters of fatty acids in which the fatty acid contains from 8 to 30 carbon atoms are those of the structure:

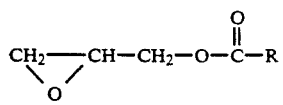

where R is a hydrocarbon radical containing from 3 to 26 carbon atoms. Examples of such materials are glycidyl butyrate, glycidyl palmitate, glycidyl laurate and glycidyl stearate. Preferably, R is a branched hydrocarbon radical, more preferably a tertiary aliphatic group of 8 to 10 carbon atoms such as is present in glycidyl neodecanoate. Glycidyl esters of commercially available mixtures of tertiary aliphatic carboxylic acids such as those available from the Shell Chemical Company as VERSATIC ACID 911 are particularly preferred. One glycidyl ester of this type is commercially available from Shell Chemical Company as CARDURA E.

The phosphorus-containing acids which are used in the practice of the invention are those of the structural formula:

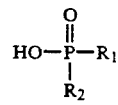

where $R_1$ and $R_2$ can be the same or different and can be hydrogen or hydroxyl with at least $R_1$ or $R_2$ being hydrogen. Examples of suitable phosphorus-containing acids include phosphorous and hypophosphorous acids and mixtures thereof.

The phosphorus-containing acid and monoepoxide are reacted together by simply mixing and heating optionally in the presence of organic solvent typically to 50° to 120° C. for about 30 minutes to 2 hours. The progress of the reaction can be monitored by measuring the epoxy equivalent. Usually reaction is conducted until the epoxy equivalent is too high to measure indicating essentially complete reaction.

The relative amount of phosphorus-containing acid and monoepoxide are such that the molar ratio of phosphorus-containing acid to monoepoxide is typically from 1:1 to 1:4, more usually 1:1 to 1:3. Ratios greater than 1:1 (acid in excess) are not preferred because excess acid can adversely affect humidity resistance in the finished coating.

The phosphorus-containing acid-monoepoxide reaction product will typically have a hydroxyl value of 80 to 350 on a resin solids basis.

The hydroxyl-containing reaction product described above is further reacted with an anhydride to introduce carboxylic acid functionality into the resulting reaction product. Examples of suitable anhydrides are 1,2-dicarboxylic acid anhydrides. These anhydrides contain from about 2 to 30 carbon atoms which are exclusive of the carbon atoms in the anhydride group. Examples include aliphatic, cycloaliphatic, olefinic and cycloolefinic anhydrides. Substituted aliphatic anhydrides in which the substituents would not adversely affect the reactivity of the anhydride or the properties of the resultant reaction product can also be used. Examples of substituents would be chloro and alkoxy. Examples of anhydrides include succinic anhydride, methylsuccinic anhydride, dodecenylsuccinic anhydride, octadecenylsuccinic anhydride, hexahydrophthalic anhydride, methylhexahydrophthalic anhydride, itaconic anhydride, citraconic anhydride and nadic anhydride. Preferred are carbocyclic anhydrides of a 1,2-dicarboxylic acid.

The hydroxyl-containing reaction product and anhydride are reacted together by simple mixing usually in the presence of organic solvent and heating to 80° to 120° C. for about 60 minutes to 4 hours. The progress of the reaction can be monitored by taking a series of IR spectra and measuring the disappearance of the peak attributable to anhydride. Reaction is complete when the anhydride peak disappears or becomes very weak.

The relative proportions of the hydroxyl functional reaction product and the anhydride are such that the equivalent ratio of hydroxyl functionality in the reaction product to anhydride functionality of the anhydride is preferably from 1:0.1 to 1:1, more preferably 1:0.5 to 1:1. Ratios greater than 1:0.1 are not preferred because of insufficient carboxyl functionality in the reaction, whereas ratios less than 1:1 are not preferred because extra acid functionality can cause humidity problems in the finished film.

Typically, the reaction product has an acid number of 50 to 200 determined on a solids basis.

The overall mole ratio of phosphorus-containing acid to monoepoxide to anhydride is usually within the range of 1:0.5:0.5 to 1:4:4, preferably 1:1:1 to 1:2.5:2.

The reaction products preferably are incorporated into film-forming compositions in amounts of about 0.1 to 10, more preferably 1 to 8 percent by weight based on weight of resin solids to promote adhesion and prevent yellowing of the resultant coating. Amounts less than 0.1 percent by weight are insufficient for this purpose, whereas amounts greater than 8 percent by weight are not preferred because of no extra benefit and possible decrease in coating properties because of a dilution effect.

The curable film-forming compositions into which the reaction products of the invention can be incorporated comprise resinous film formers which contain functional groups which are reactive with carboxyl and which have a tendency to yellow on cure. Examples of such curable compositions are those which are catalyzed with amines and include polyol-anhydride curable film formers such as described in U.S. Pat. No. 4,452,948 to Marrion et el and polyepoxide film formers based on polyepoxides and polycarboxylic acids such as described in U.S. Pat. No. 4,703,101 to Singer et al. Also, the additives of the present invention are reactive with aminoplast curable compositions and preferably in this instance will contain some hydroxyl functionality.

The coating composition can be a liquid composition as described in the above-mentioned patents or can be in a solid particulate form to form a powder coating as described in Re. U.S. Pat. No. 32,261 to Hirota et al.

The curable film-forming compositions can be pigmented in light or pastel colors where yellowing is a problem or can preferably be unpigmented and depositable to form a clear film.

In clear coat applications, the coating compositions can be applied over pigmented or colored basecoats to form color plus clear composite coatings. Such composite coatings using resinous film formers are described in U.S. Pat. No. 4,681,811 to Simpson et al. Suitable basecoat compositions and methods of application of basecoats and clear coats are described in the aforementioned U.S. Pat. No. 4,681,811.

EXAMPLES

The invention will be further described by reference to the following examples. Unless otherwise indicated, all parts are by weight.

EXAMPLE 1

Reaction Product of Phosphorous Acid/CARDURA E/Hexahydrophthalic Anhydride [1:2, 3:2 molar ratio]

A reaction vessel was fitted with an electrical heater, stirrer, condenser, and stainless steel thermocouple. To the reactor was added 41 grams of phosphorous acid, 300 grams of CARDURA E and 100 grams of ethyl 3-ethoxypropionate solvent. The contents of the reactor were heated to 50° C. to initiate an exotherm with the temperature rising to 100° C. The reactants were cooled to 80° C. with a water bath. The reaction mixture was then maintained at 80° C. for two hours with gentle heating. The reaction mixture was cooled to 50° C. and a total of 154 grams of hexahydrophthalic anhydride was added to the reaction flask and the mixture heated to 100° C. The reaction mixture was maintained at 100° C. for approximately five hours until the anhydride peak in the IR spectrum was noted to be very weak. The resulting resinous material was found to have a Gardner-Holdt letter viscosity of Z2, a solids content of 84.9 percent, an acid value of 144.2 and a hydroxyl value of 10.

EXAMPLE 2

A clear film-forming composition was prepared from the following ingredients:

| Ingredients | Parts by Weight (grams) | Percent Resin Solids |
|---|---|---|
| TINUVIN 328[1] | 3.2 | 3.2 |
| Xylene | 34.3 | — |
| SOLVESSO 100[2] | 6.0 | — |
| n-Butyl acetate | 3.6 | — |
| Methyl ethyl ketone | 1.2 | — |
| Flow control agent[3] | 3.4 | 1.5 |
| RESIMENE 757[4] | 50.0 | 50.0 |
| Polyester resin[5] | 22.2 | 20.0 |
| Acrylic resin[6] | 40.7 | 28.5 |
| Polybutyl acrylate[7] | 0.7 | 0.4 |
| Ethanol | 6.0 | — |
| Acid catalyst[8] | 2.5 | 0.75 (acid) |
| Reaction Product of Example 1 | 7.2 | 6.0 |

[1]Substituted benzotriazole UV light stabilizer from Ciba-Geigy Corporation.
[2]Aromatic solvent blend available from Exxon Chemical.
[3]Polymeric microparticle prepared in accordance with Example 11 of U.S. Pat. No. 4,147,688.
[4]Melamine-formaldehyde crosslinking agent available from Monsanto.
[5]Polyester polyol prepared from 42.5 percent hexahydrophthalic anhydride and 57.5 percent neopentyl glycol. The polymer had an acid value of about 8; a weight average molecular weight of about 500; a solids content of 90 percent in xylene.
[6]Acrylic polymer prepared from 40 percent hydroxypropyl acrylate, 20 percent styrene, 19 percent butyl acrylate, 18.5 percent butyl methacrylate, 2 percent acrylic acid and 0.5 percent methyl methacrylate. The polymer had a weight average molecular weight of about 5000; a solids content of 70 percent in isobutanol:xylene:-SOLVESSO 100 (10:45:45 weight ratio).
[7]Polybutyl acrylate having a weight average molecular weight of about 10,000 and a number average molecular weight of about 2400. The polymer had a solids content of 62.5 percent in xylene.
[8]A blend of 87.9 percent dinonylnaphthalene disulfonic acid (available from King Industries) and 12.1 percent diisopropanolamine. This resin had a solids content of 37.5 percent in isopropanol:water (92:8 weight ratio).

COMPARATIVE EXAMPLE 2A

A second clear film-forming composition similar to that of Example 2 was prepared with the exception that the reaction product of Example 1 was not present in the composition.

Examples 2 and 2A were separately spray applied to steel panels which were previously coated with a pigmented white colored basecoat. The basecoats were spray applied in two passes at a temperature of about 25° C. The basecoat was given a 90-second flash at ambient conditions between coats, and a final flash of 5 minutes. The film thickness for the basecoat was about 1.3 mil.

After application of the second basecoat, two coats of the clearcoat compositions were spray applied. The two coats were applied wet-on-wet to the basecoated panels with a 90-second flash off at room temperature between the coats. After a final 5-minute flash off, the panels were then baked at 285° F. (142° C.) for 30 minutes.

The coated panels were evaluated for gloss, distinctness of image and yellowing index using a Macbeth Color Eye.

TABLE 1

| Property | Example 2A | Example 2 |
|---|---|---|
| Clearcoat Film Thickness (in mils) | 2.20 | 2.30 |
| 20 Degree Gloss[1] | 89 | 88 |
| Distinctness of Image[2] | 97 | 97 |
| Yellowing Index[3] | −1.267 | −1.746 |

[1]Measured with a 20° gloss meter manufactured by Gardner Instrument Co.
[2]Determined with C-Box manufactured by C-Box I²R Co.
[3]Measured by Macbeth spectrophotometer, Model MS22T. Yellowness Index is based on ASTM test method, D-1925. The higher the number, in the case of Examples 2 and 2A, the less negative the number, the greater the degree of yellowing in the cured film.

EXAMPLE 3

A clear powder coating composition was prepared by dry blending, extruding and particulating the following ingredients:

| Ingredients | Parts by Weight |
|---|---|
| Polyepoxide[1] | 665 |
| Dodecanedioic acid | 161 |
| Additive mix[2] | 43 |
| RESIFLOW-L[3] | 6.6 |
| Reaction product of Example 1 | 28.9 (3.5% by weight based on weight of resin solids) |
| Methyldioctylamine (catalyst) | 13.6 |

[1]Epoxy group-containing acrylic polymer made from glycidyl methacrylate, isobornyl methacrylate, styrene, methyl methacrylate and alpha-methylstyrene dimer having an epoxy equivalent weight of 409 and a GPC (gel permeation chromatography) peak molecular weight of 4727.
[2]The additive mix contained:

| Ingredients | Parts by Weight |
|---|---|
| TINUVIN 900[a] | 57.7 |
| TINUVIN 144[b] | 19.2 |
| Benzoin | 15.4 |
| CAB-O-SIL TS-610[c] | 7.7 |

[a]UV absorber available from Ciba-Geigy Corp.
[b]Stabilizer available from Ciba-Geigy Corp.
[c]Silica available from Cabot Corp.
[3]Flow control agent available from Monsanto Co.

COMPARATIVE EXAMPLE 3A

A second clear powder coating composition similar to Example 3 was prepared but without the reaction product of Example 1.

A series of panels were coated with white basecoat compositions as described in Example 2. After application of the second basecoat, two coats of the clear powder coating composition of Examples 3 and 3A were separately electrostatically sprayed onto the basecoat via a dry-on-wet application. The composite coatings were then baked at 275° F. (135° C.) and separately coated panels baked at 300° F. (149° C.) each for 30 minutes. The cured coating was then evaluated for yellowness as described in Example 2.

| Cure Conditions | Example 3 | Example 3A |
|---|---|---|
| 30 minutes/275° F. (135° C.) | 1.76 | 2.13 |
| 30 minutes/300° F. (149° C.) | 2.26 | 6.18 |

The coated panels were also evaluated for adhesion of the clearcoat to the basecoat.

Adhesion ratings are performed by etching a cross-hatched pattern in the coating and applying masking tape to the cross-hatch area. The tape is then pulled off sharply at right angles to the plane of the surface being tested. Ratings are assigned from 0–5, with 0 indicating no coating pickoff and 5 indicating essentially complete coating pickoff. The results are reported below.

| Cure Conditions | Example 3 | Example 3A |
|---|---|---|
| 30 minutes/300° F. (149° C.) | 0.5 | 4 |

We claim:

1. A curable film-forming composition comprising a resinous film-forming polymer which is reactive with carboxyl and a crosslinking agent, wherein the curable composition has a tendency to yellow on cure, characterized in that the curable composition contains from about 0.1 to 10.0 percent by weight based on total weight of resin solids of an acid functional compound which is the reaction product of: (i) a monoepoxide, (ii) a phosphorus-containing acid of the structure:

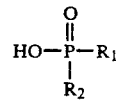

where $R_1$ and $R_2$ can be the same or different and can be hydrogen or hydroxyl with at least $R_1$ or $R_2$ being hydrogen, and (iii) an anhydride.

2. The curable film-forming composition of claim 1 wherein the resinous film-forming polymer comprises a polyepoxide and the crosslinking agent comprises a polycarboxylic acid.

3. The curable film-forming composition of claim 1 wherein said phosphorus-containing acid is selected from the group consisting of phosphorous acid, hypophosphorous acid, and mixtures thereof.

4. The curable film-forming composition of claim 1 wherein said phosphorus-containing acid is phosphorous acid.

5. The curable film-forming composition of claim 1 wherein the mole ratio of phosphorus-containing acid to monoepoxide to anhydride is from about 1:0.5:0.5 to 1:4:4.

6. The curable film-forming composition of claim 1 wherein said monoepoxide is a glycidyl ester of a fatty acid in which the fatty acid contains from 5 to 30 carbon atoms.

7. The curable film-forming composition of claim 6 wherein said monoepoxide is a glycidyl ester of a fatty acid which is a tertiary aliphatic carboxylic acid containing from 8 to 10 carbon atoms.

8. The curable film-forming composition of claim 1 wherein said anhydride is a carbocyclic anhydride of a 1,2-dicarboxylic acid.

9. The curable film-forming composition of claim 8 wherein said carbocyclic anhydride is selected from the class consisting of hexahydrophthalic anhydride and alkyl-substituted hexahydrophthalic anhydride.

10. The curable film-forming composition of claim 1 which has an acid value of 50 to 200.

11. The curable film-forming composition of claim 1 which is in a solid particulated form.

* * * * *